United States Patent [19]

Kobayashi

[11] Patent Number: 5,479,623
[45] Date of Patent: Dec. 26, 1995

[54] STARTING SYSTEM FOR MULTIPLE RESIDENT PROCESSES UNDER DOS

[75] Inventor: Masahiro Kobayashi, Yaizu, Japan

[73] Assignee: Fujitsu Limited, Kawasaki, Japan

[21] Appl. No.: 46,922

[22] Filed: Apr. 14, 1993

Related U.S. Application Data

[63] Continuation of Ser. No. 459,981, Mar. 20, 1990, abandoned.

[30] Foreign Application Priority Data

Mar. 20, 1989 [JP] Japan ..................... 1-068520

[51] Int. Cl.⁶ .................................. G06F 12/08
[52] U.S. Cl. .................. 395/700; 364/970; 364/970.5; 364/DIG. 1
[58] Field of Search ..................... 395/650, 700, 395/400

[56] References Cited

U.S. PATENT DOCUMENTS

| | | | |
|---|---|---|---|
| 4,807,186 | 2/1989 | Ohnishi et al. | 364/900 |
| 5,029,078 | 7/1991 | Iwai | 364/200 |
| 5,123,098 | 6/1992 | Gunning et al. | 395/400 |

*Primary Examiner*—Kevin A. Kriess
*Assistant Examiner*—John Q. Chavis
*Attorney, Agent, or Firm*—Staas & Halsey

[57] ABSTRACT

A starting system starts a plurality of processes which stay resident in memory in accordance with the operation of MS-DOS. The starting system is divided into a main load control task, a before-starting task, and an after-starting task. The main load control task performs a load and execute operation for the plurality of processes, the before-starting task analyzes parameters and checks the starting environment, and the after-starting task checks whether or not all of said plurality of processes have been started.

3 Claims, 17 Drawing Sheets

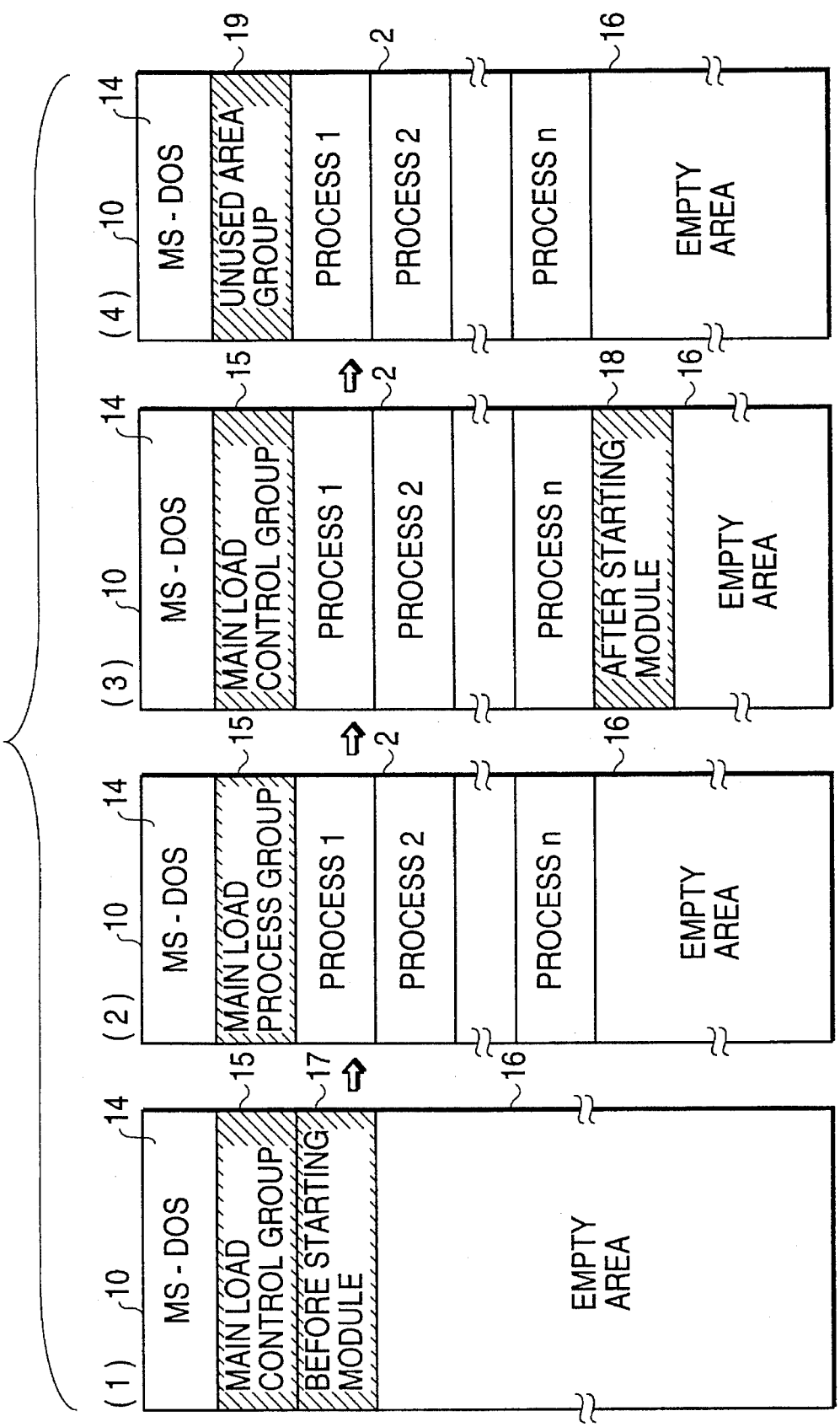

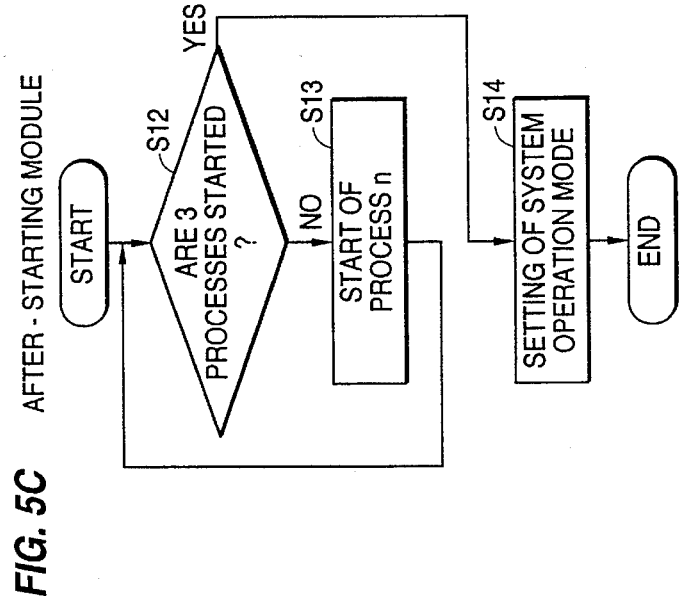
FIG. 5A MAIN LOAD CONTROL UNIT
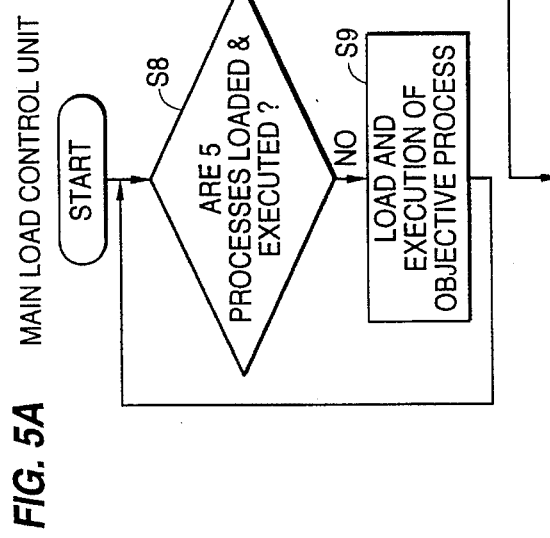
FIG. 5B BEFORE - STARTING MODULE
FIG. 5C AFTER - STARTING MODULE
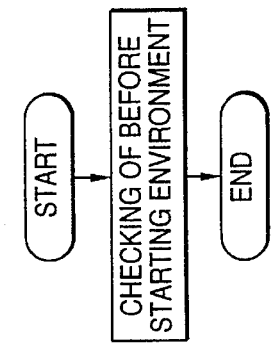
FIG. 6A
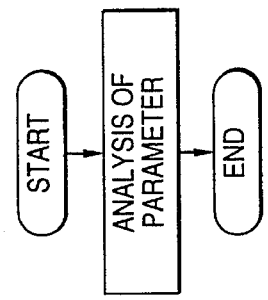
FIG. 6B

FIG. 7

LSVLIB [LOG OBTAINING REQUEST]
[STANDARD ASSOCIATION AND NOT-STARTING DESIGNATION]

PARAMETER FOR LOG OBTAINING REQUEST

| CHARACTER STRING | TREATMENT |
|---|---|
| ABBREVIATION | |
| LOG | NO LOG OBTAINED |
| LOGCLINT | LOG OBTAINED (TRACING AN INPUT/OUTPUT OF TRANSFER PROCESS) |
| LOGALL | LOG OBTAINED (TRACING AN INPUT/OUTPUT OF CLIENT PROCESS) |
| | LOG OBTAINED (TRACING AN INPUT/OUTPUT OF BOTH CLIENT/ TRANSFER PROCESS) |

PARAMETER FOR STANDARD ASSOCIATION NOT STARTING DESIGNATION

| CHARACTER STRING | TREATMENT |
|---|---|
| ABBREVIATION | START STANDARD ASSOCIATION PROCESS |
| ONLYCLNT | NOT START STANDARD ASSOCIATION PROCESS |

FIG. 9

| COMPLETION CODE | MEANING | OUTPUT SOURCE | REMARKS |
|---|---|---|---|
| 0x00 | NORMAL | ALL | |
| 0x02 | ERROR | STARTING MAIN | EXECUTION FORMAT FILE FOR STARTING CHECK DOES NOT EXIST |
| 0x08 | ERROR | STARTING MAIN | MEMORY FOR OPERATING STARTING CHECK DOES NOT EXIST |
| 0x20 | PARAMETER ERROR | STARTING CHECK | |
| 0x21 | ABNORMAL ENVIRONMENT | STARTING CHECK AFTER STARTING PROCESS | LSVLIB OPERATION ENVIRONMENT ERROR |
| 0x23 | MEMORY CAPACITY LACKING | STARTING CHECK AFTER STARTING PROCESS | MEMORY FOR OPERATING LSVLIB DOES NOT EXIST |
| 0x24 | FILE DOES NOT EXIST | STARTING CHECK AFTER STARTING PROCESS | EXECUTION FORMAT FILE DOES NOT EXIST |
| | ABNORMAL SYSTEM | | CONTACT WITH MAKER |

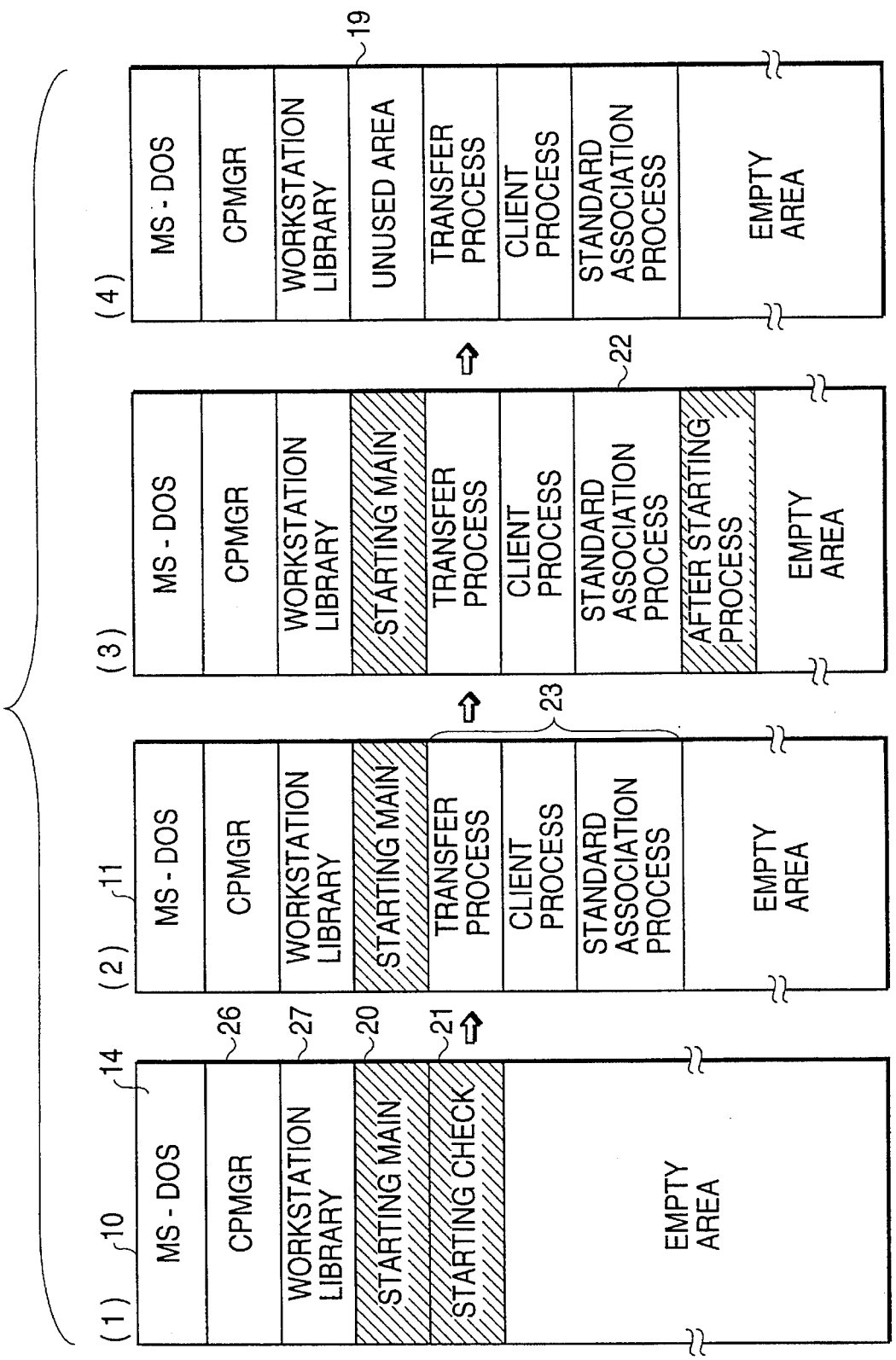

FIG. 12

| MODULE NAME | WORD | CONTENT |
|---|---|---|
| STARTING MAIN 20 | YPS | MAIN PROGRAM FOR STARTING PROCESS OF LSVLIB |
| STARTING CHECK MAIN 21 | YPS | MAIN PROGRAM FOR STARTING CHECK |
| AFTER - STARTING PROCESS MAIN 22 ① | YPS | MAIN PROGRAM FOR AFTER-STARTING PROCESS |
| ANALYZE STARTING COMMAND ② | YPS | ANALYSIS OF STARTING PARAMETER |
| CHECK STARTING ENVIRONMENT ③ | YPS | CHECK OF STARTING ENVIRONMENT |
| OUTPUT MESSAGE | YPS | EXECUTION OF MESSAGE OUTPUT |
| PURGE CONTROL | YPS | CONTROL PURGE OF EACH PROCESS |
| REQUEST FOR RESET | YPS | EXECUTION OF RESET REQUEST UPON DETECTING ABNORMALITY |
| CONVERSION OF BASIC INFORMATION ④ | YPS | CONVERSION OF CLIENT'S BASIC INFORMATION INTO LSVLIB FORMAT |
| EXECUTION OF PROCESS 28 | C | EXECUTION OF DESIGNATED PROCESS |
| DELETION OF FILE ⑥ | C | EXECUTION OF DELETION OF PROCESS |
| SEARCH OF FILE ⑧ | C | SEARCH FILE CONSIDERING PATH |
| START UP FOR STARTING MAIN | ASM | RELEASE FILE AREA CONSIDERING PATH |
| SCREEN OUTPUT 31 OF CHARACTER STRING | ASM | EXECUTION OF SCREEN OUTPUT OF CHARACTER STRING |
| GET LSVPATH ⑦ | ASM | GET ENVIRONMENT VARIABLE LSVPATH |
| GET COMPLETION CODE OF SUB PROCESS ⑤ | ASM | GET COMPLETION CODE FOR SUB PROCESS |
| SEARCH FILE 32 | ASM | SEARCH FILE COINCIDENT FOR THE FIRST TIME |
| GET REMAINING USABLE MEMORY QUANTITY ⑨ | ASM | GET REMAINING USABLE MEMORY QUANTITY |
| GET SYSTEM AREA 29 | ASM | CONFIRM STARTING STATE OF CPMGR |
| GET TCB 30 | ASM | CONFIRM STARTING STATE OF DESIGNATED TASK |
| GET MAIL BOX | ASM | KEEP MAIL BOX AREA (SEL-ALLOCATION) |
| SEND MAIL BOX | ASM | SEND MAIL BOX (SEL-SEND) |
| CONVERSION OF NUMERAL VALUE-HEXADECIMAL CHARACTER STRING | H | CONVERT NUMERAL VALUES INTO HEXADECIMAL |
| STARTING/END COMMON DEFINE HEADER | H | DECLARE DEFINE FOR USING COMMONLY IN STARTING/END |
| HEADER FOR STARTING MAIN | H | DEFINITION OF MESSAGE OUTPUTTING AT STARTING MAIN |
| HEADER FOR STARTING CHECK | H | DEFINITION OF MESSAGE OUTPUTTING AT STARTING CHECK |
| HEADER FOR RESET REQUEST | H | DEFINITION OF MESSAGE OUTPUTTING AT RESET REQUESTING |

STARTING SYSTEM FOR MULTIPLE RESIDENT PROCESSES UNDER DOS

This application is a continuation, of application Ser. No. 07/495,981, filed Mar. 20, 1990, now abandoned.

BACKGROUND OF THE INVENTION

The present invention relates to a starting system for memory resident process groups in MS-DOS, and more particularly to a starting system for minimizing the memory region which is left unusable at the completion of the starting process.

Recently, total and integrated office automation has been realized by using micro-mainframe links for connecting personal computers and workstations to a host computer. To enable the micro-mainframe link to be used effectively by the user, it is necessary to provide personal computers with a software library including various services. The software library usually comprises a plurality of resident process groups in the main memory of the personal computer.

After the user logs on to the personal computer he calls the software library and then starts it. The necessary process group is resident in the main memory and can be prepared for immediate operation. If the library does not stay resident in the main memory, a high speed response cannot be achieved when an execution request is made and then a computer system fails to operate at a high speed. In a personal computer system using MS-DOS as an operating system, the starting module including all the processes necessary for starting is conventionally carried out under MS-DOS and the process group is put in an executable state. FIG. 1A shows an operational flowchart of the conventional starting module.

The starting module is designed to perform a process which does not stay resident in the memory. Under MS-DOS, this starting module is loaded and executed by a starting command. Then it carries out an analysis (S70) of a parameter attached to the starting command and a check of the starting environment (S71) for confirming the starting state of the system area which should have been already started. Thereafter, the starting module executes a first process 1 from the process group by using the load and execution commands (S73). Process 1 executed by the starting module enables the process 1 itself to stay resident in the memory and returns the control to the starting module of the calling source. The starting module then performs a starting process for process 1 (S74), enabling process 1 to be in an executable state, namely, in a state in which an event occurrence is being waited. Thus, the starting process of process 1 is completed.

The starting module executes starting process 2 to process n by repeating procedures S73 and S74, thereby enabling processes 2–n to be in an executable state. When all the processes of the process group have been subject to load and execution (the YES branch from S72), the following process (other process in S75) is executed, and then the starting process is completed. The starting module is designed as a memory-non-resident process, whereby MS-DOS deletes the starting module from the memory when all the processes of the starting module have been completed.

FIG. 1B shows a memory arrangement in the conventional starting system for using the starting module described above. The memory arrangement changes are shown in (1)–(4) in accordance with the progress of the starting process.

The starting module is loaded under the MS-DOS operating system in the main memory, namely, in an address following the address in which the MS-DOS is stored and is thereafter executed (1 in FIG. 1A). After the starting module has performed an analysis of a parameter (S70 in FIG. 1A) and a check of the starting environment (S71 in FIG. 1A), a process 1 is loaded in the memory area which follows that of the starting module and then is executed (S73 in FIG. 1A). This execution is to obtain a memory area which is used when a request for the execution of the process 1 is made. After process 1 itself has been made to stay resident in the memory, the starting module puts process 1 in an executable state, namely, starts process 1, by means of the starting process (S74 in FIG. 1A). This starting process registers a task for waiting an occurrence of an event. As a result, process 1 stays resident in the area following the starting module in the memory shown in (2) of FIG. 1B.

When the above processes (S72–S74 in FIG. 1A) are repeated for processes 2 to n, and when all the processes (processes 1 to n) are put in an executable state (as the branch YES of S72 in FIG. 1A) the memory arrangement is formed as shown in (3) of FIG. 1B such that processes 1 to n stay resident in parallel in the memory region following that of the starting module. Next, the starting module executes any other process (S75 in FIG. 1A) and then it is deleted from the memory. As a result, on completion of starting of processes 1 to n, the memory region in which the starting module is loaded remains as unused area in the memory as indicated by (4) in FIG. 1B. Conventionally, the size of the starting module is 9 Kbytes and this 9 Kbytes usually remains unusable.

Further, there is a high possibility that the function of the starting module will later be further expanded. In this case, the capacity of the starting module will become even larger, thereby increasing the unused memory area remaining after completion of the starting process.

When the process group forming the above-mentioned software library is made to stay resident in memory under MS-DOS, the used memory capacity must be minimized. If the capacity of the main memory is 1 Mbyte, the remaining area is judged to be about 256 Kbytes excluding the memory area which the MS-DOS operating system and other system software occupy. Therefore, if the user wishes to preserve at least 128 Kbytes, the capacity of the memory used by the memory resident process group must be less than 128 Kbytes.

However, optimization of the memory resident process group has already been advanced and further the process has been written in C-language, making it extremely difficult to decrease the unused program area by even 1 Kbyte in the program.

Reduction of the useless memory capacity (which is currently about 9 Kbytes and which may increase in accordance with the expansion of its function in the future), corresponding to the starting module and remaining after starting memory resident process group, is very important.

SUMMARY OF THE INVENTION

An object of the present invention is to decrease the useless memory space remaining after completion of starting a memory resident process group and to extend the user area by the decreased useless memory area.

Another object of the present invention is not to increase the useless memory space even when a new function is added to the starting module, thereby increasing the flexibility of memory usage.

A feature of the present invention resides in a system for starting a plurality of processes which stay resident in a memory in accordance with a disc operating system (DOS), the starting system being divided into a main load control means, before-starting means, and after-starting means, the load control means performing a load and execution operation for all the processes, the before-starting means analyzing a parameter and checking a starting environment and the after-starting process checking whether or not all the processes have been started.

BRIEF DESCRIPTION OF THE DRAWINGS

FIG. 4A is a diagram showing a memory location in an embodiment of the present invention, FIGS. 5A to 5C show flowcharts of the present invention and where the number of resident processes is 3, FIGS. 6A and 6B are flowcharts showing a method of dividing the before-starting modules, FIG. 7 is an explanatory view of a parameter of LSVLIB command, FIG. 9 is an explanatory view of a completion code which is outputted in the output interface, FIG. 10 is a diagram designating the memory location of the starting process, FIG. 12 is an explanatory view of the modules' functions.

EMBODIMENT OF THE PRESENT INVENTION

Figure 2A:
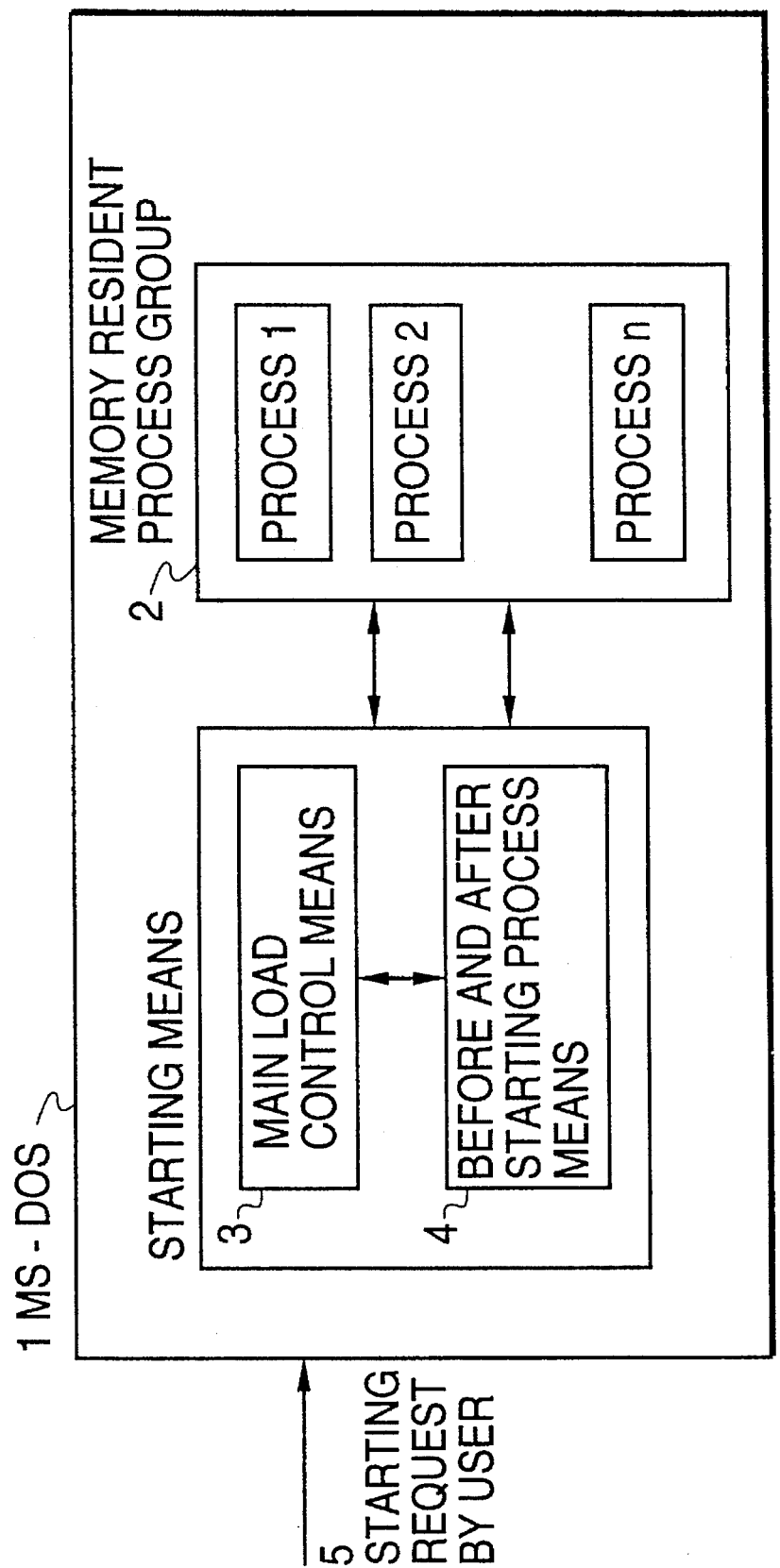
FIG. 2A is a functional block diagram of the present invention.

FIG. 2A shows a functional block diagram of the present invention. The present invention starts a memory resident process group 2 comprising a plurality of processes (process 1, process 2, . . . process n) staying resident in the main memory in an MS-DOS computer system 1.

Main load control means 3 exists in the main memory from the input of the starting request (task registration request) 5 input by a user until the completion of the staying-resident and the starting of all the processes, executes before-and after-starting process means 4 and memory resident process group 2 sequentially, and controls all the starting processes of the memory resident process group. Main load control means 3 operates under DOS (for example, MS-DOS) and uses load and execute commands in DOS before and after starting process means 4 and memory resident process group 2 are executed. Main load control means 3 does not stay resident in the main memory, but is deleted from the main memory upon completion of the starting of the memory resident process groups. The memory area from which main load control means 3 is deleted remains as an unusable area.

Before- and after-starting process means 4 is loaded by the load and execute command issued by main load control means 3 in the memory region and executes the starting of the main memory resident process and the process to be performed before and after the starting of the process. Before- and after-process means 4 is deleted from the main memory after a completion of the process to be executed.

The user issues a starting request 5 to DOS computer system 1 such as a personal computer so that a plurality of processes (memory resident group 2) which is expected to reside in the main memory are started. Then, this starting request 5 is received by DOS of DOS computer system 1 and main load controlling means 3 is loaded in the main memory under the management of DOS and the process of main load control means 3 is thus carried out.

The load area of the main load control means 3 preferably becomes a usable area for a user after the completion of the deletion thereof, e.g., as described below with reference to FIG. 4B.

Main load control means 3 loads the process to be performed before starting by using the load and execute commands of DOS and enables before- and after-starting process means 4 to execute them. Before- and after-starting process means 4 receives load and execute commands and executes a process to be performed before starting, and thereafter returns the control to main load control means 3.

Next, main load control means 3 provides load and execute commands to the memory resident process group. The memory resident process group is loaded in the memory by the load command. A memory resident process receives the execute command and executes a process for making respective processes stay resident in the memory and thereafter returns control to the load control means 3.

Further, main load control means 3 issues the load and execute command to before- and after-starting process means 4, to load and execute the processes executed before and after the starting of the memory resident processes in the main memory. Before- and after-starting process means 4 receives load and execute commands and starts the respective memory resident processes which have already stayed resident in the main memory, and thereafter executes the process to be executed after the starting process. Before- and after-starting process means 4 returns control to main load control means 3 after completing these processes. Therefore, the process of main load control means 3 is completed, thereby ending a starting process of the memory resident process group.

Main load control means 3 controls the entire starting process of the main memory resident process group and exists in main memory from when it is loaded by user's starting request 5 to the completion of the entire starting process. In contrast, before- and after-starting process means 4 is deleted from the main memory every time the before-starting process, starting process and after-starting process are respectively completed, and the memory area used by the before- and after-starting processes is released for other process modules.

For example, the before-starting process is deleted from the main memory before the memory resident process group is loaded to stay resident. Therefore, the released memory area can be a part of the area used by the memory resident process group. When the process module of the starting process and after-starting process which exist in a position after the area used by the memory resident process group in the main memory is deleted, the area used for the starting process module is released for other user programs.

As a result, the starting process is divided into main load control means 3 and before and after starting process means 4, and the memory area which cannot be used is decreased only to the load area of the main load control means. Further, if the main control means 3 is at the other end of the user area, a region which cannot be used after the deletion of the main load control means 3 does not exist and the memory can be more effectively utilized.

Figure 2B:
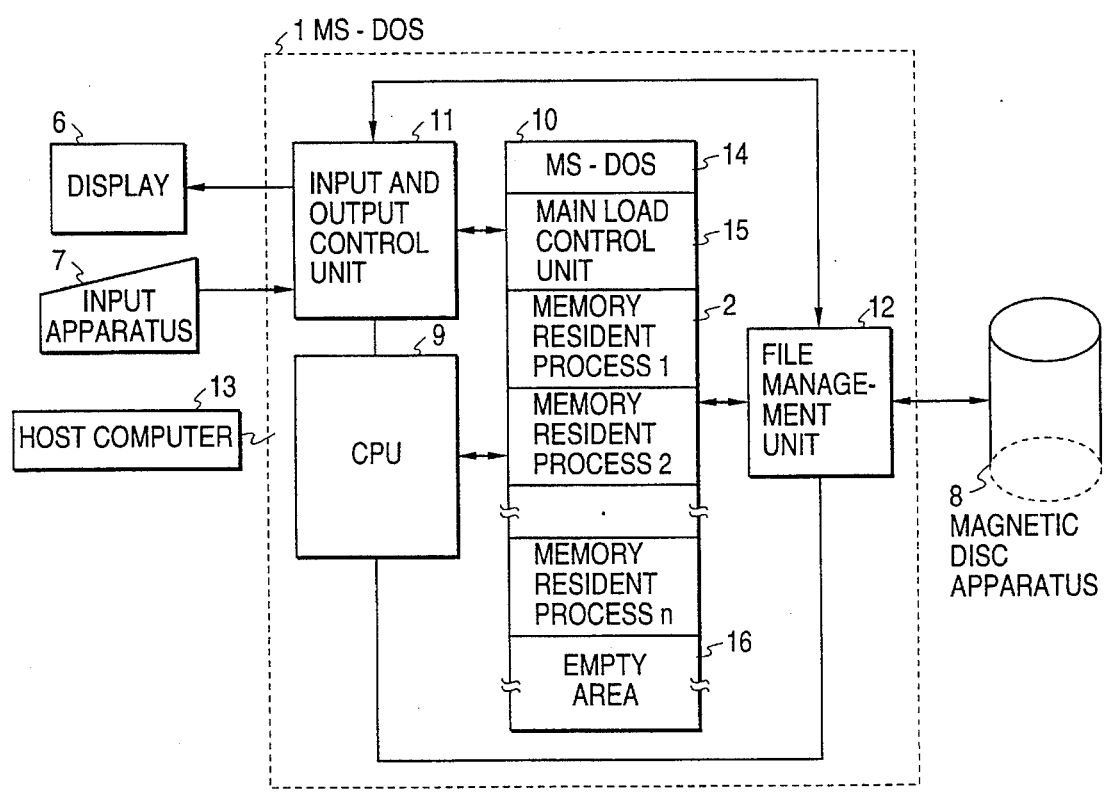
FIG. 2B is a diagram of an embodiment of the present invention.

FIG. 2B shows a block diagram of an embodiment of the present invention. The present embodiment comprises a computer system, such as MS-DOS computer 1, display 6 for designating a process content of the computer, an input apparatus 7 such as a keyboard for performing an input process to the computer, and magnetic disc apparatus 8 for storing software and data. MS-DOS computer 1 comprises CPU 9, main memory 10, input and output control unit 11 and file management unit 12.

CPU 9 executes a process module loaded from magnetic disc apparatus 8 to main memory 10 through file management unit 12 and executes a process in association with host computer 13 through a communication line.

Input and output control unit 11 receives various command and data input from input apparatus 7 and provides them to CPU 9 and outputs the process results of CPU 9 and messages onto display 6, thereby operating as an interface.

File management unit 12 is an interface between magnetic disc apparatus 8 and CPU 9 or input and output control unit 11.

Main memory 10 is connected to CPU 9, input and output control unit 11 and file management unit 12 and stores the process module or data executed by CPU 9.

The operation of the embodiment with the above structure is explained below. In accordance with an initializing process of MS-DOS computer 1, MS-DOS 14 is loaded in main memory 10 from magnetic disc apparatus 8 as an operating system and CPU 9 executes MS-DOS to start the system. Next, when the user starts the memory resident process, he inputs a command for starting the memory resident process from input apparatus 7. Input and output control unit 11 receives this command and provides it to MS-DOS 14.

MS-DOS 14 receives this command, loads main load control unit 15 which controls the entire starting process, into main memory 10, and executes the starting process of the main memory resident process in accordance with control of main load control unit 15. A detailed explanation of the operation of main load control unit 15 is provided later.

If the number of processes which stay resident in a memory is n, the n memory resident processes 2 are loaded after the memory region of the main load control unit 15 in main memory 10. Upon completion of the starting process of memory resident process group 2, main load control unit 15 is deleted from main memory 10 and the area corresponding to main load control unit 15 becomes an area which cannot be used except by a process which can fit in such a small area. The area below the memory resident processes n in main memory 10 is empty area 16 and becomes a user area.

The operation of the embodiment of the present invention will be explained by referring to the operational flowchart of FIG. 3. The starting process of memory resident process group 2 is carried out by CPU 9 under the control of main load control unit 15 loaded in main memory 10 using the starting command input by the user as described above.

Generally speaking, the CPU executes respective programs (modules) to achieve their object. DOS manages the execution of the processes and the CPU executes the DOS. Hereinafter for simplicity, such execution by CPU is expressed by the execution under the management of DOS or "the system is executed", and process A, such as a program which transfers the right of execution to another process B is expressed as "process A enables process B to perform the execution".

Figure 1A:
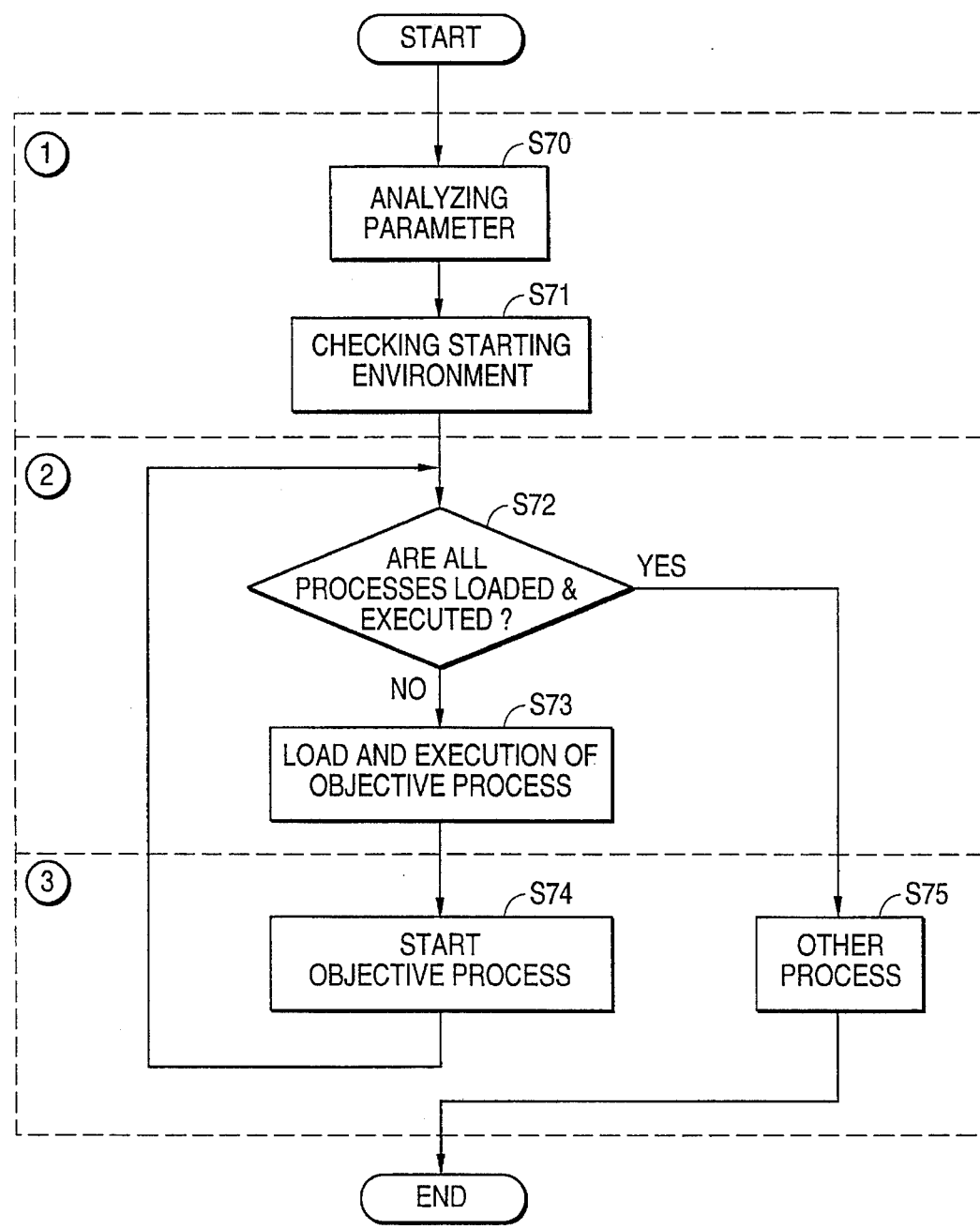
FIG. 1A is an operational flowchart of a conventional starting module.

A software module for executing the starting process comprises main load control unit 15, a before starting module including a process to be executed before starting the process, and an after starting module including a process to be executed during or after starting. The before starting module and after starting module are called by main load control unit 15 and then executed. The main load control unit, before starting module, and after starting module correspond to 2, 1 and 3, respectively, of the operational flowchart shown in FIG. 1A. The conventional starting module is divided into three portions, 1, 2 and 3. The load and execute process of portions 1 (before starting module) and 3 (after-starting module) is carried out by 2 (main load control unit) in the same way as the load and execute of the main memory resident processes, thereby simplifying the process of the main load control.

Figure 3C:
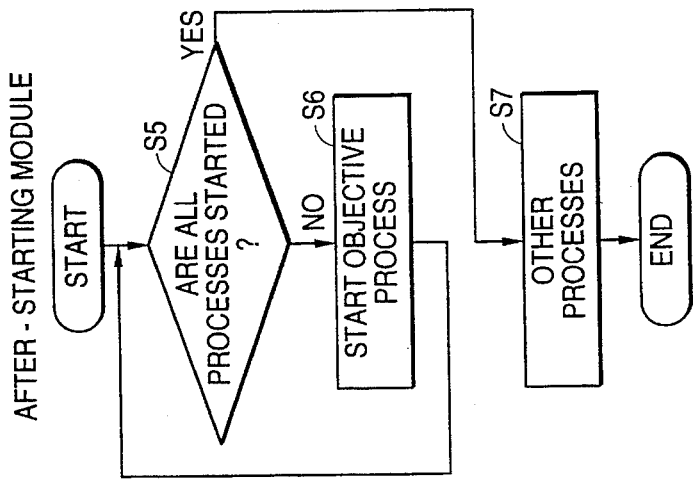
FIGS. 3A to 3C are flowcharts of one embodiment according to the present invention, respectively.
Figure 3A:
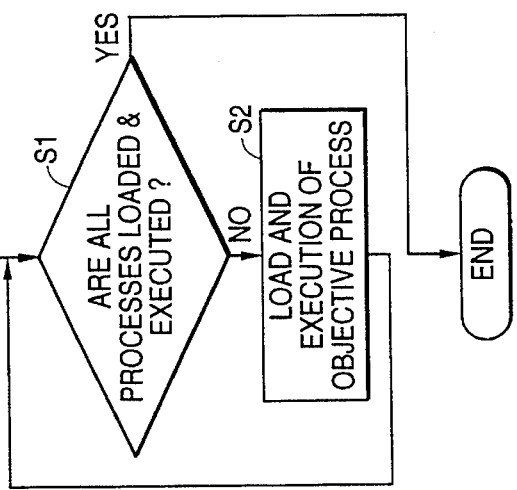
Figure 3B:
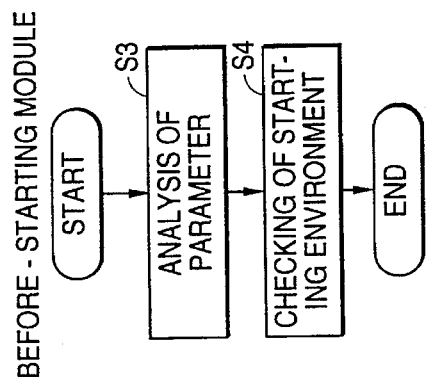

FIGS. 3A, 3B and 3C are flowcharts of the main control unit, the before starting module and the after starting module, respectively.

Main load control unit 15 judges whether all the processes to be executed have been executed (S1) and when a process which is not executed remains (judgement NO in S1), the process which is the subject of the execution is executed (S2). Where all the processes to be executed have been executed (YES at the judgement of S1), the process of the main load control unit is completed. The subject process is carried out by applying the load and execute command of MS-DOS to respective subject processes. The process of the execution of main load control unit 15 comprises a before starting module including a process to be executed before starting, respective memory resident processes to be started and an after starting module including a during starting process and an after-starting process. The load and execute command is issued repeatedly in this sequence.

When the before starting module is subjected to the load and execute operation, it is loaded into main memory 10 and executed. The process executed by the before starting module is carried out in accordance with FIG. 3B. When respective memory resident processes are subjected to load and execute operations, respective memory resident processes are loaded in main memory 10 and executed. The memory resident process is made to stay resident in memory by execution of the memory resident process. Load and execution is carried out after the process is first loaded. When this loaded process is executed, a pre-process is conducted for preparation of a process when a starting operation is later conducted, thereby to produce an event. such pre-process means an initial process such as an assignment of the data area when the execution is conducted upon a generation of the event. After starting is begun, the module is subjected to load and execute operations, then the after starting module is loaded in main memory 10 and executed. The process executed by the after starting module is shown in FIG. 3C.

In the before starting module the parameters of a starting command requested by the user are analyzed (S3) and thereafter a check of the starting environment is carried out (S4) before the starting process in order to confirm that the process is to be started operates normally, for example. Then, an execution of the before starting module is completed and then control is returned to main load control unit 15.

The after starting module judges (S5) whether or not all the processes of the memory resident process group 2 to be started have been started. If some unstarted processes remain (judgement NO in S5), the subject processes are started (S6). The starting of the subject process enables the above recited resident processes to be executed upon generation of an event. When a system manages a task, this process is registered for the task and is input in a state in which the generation of an event is awaited. If all the processes are started (judgement YES at S5) the process which should have been performed after the starting (which is explained later) is carried out (S7), thereby completing the process. When the process of the after starting module is completed, control is returned to main load control unit 15. The judgement S1 becomes YES at this point and then the process of the main load control unit 15 is completed.

A variation of a memory arrangement of main memory 10 in accordance with the above operation will be explained by referring to FIGS. 4A and 4B. When MS-DOS computer system 1 is set up, MS-DOS stays resident in the main memory 10. Main load control unit 15 is loaded by the user in the main memory in accordance with starting request 5 and the main load control unit 15 is operated under management of MS-DOS. The main load control unit does not remain resident in the memory after completion.

FIG. 4A designates a memory arrangement when main load control unit 15 executes before-starting module 17 by using "load and exec". Before-starting module 17 completes the process in accordance with the operation flowchart shown in FIG. 3B and thereafter is deleted from the memory. Main load control unit 15 then loads the memory resident processes in the sequence starting with process 1 by a command of load and execute and then executes the command of load and execute.

FIG. 4A (2) shows a memory arrangement when main memory resident processes from process 1 to process n are executed and because the before-starting module is deleted before executing process 1, an area following main load control unit 15 on main memory becomes the resident area of process 1.

When processes 1 to n have become resident in memory, then, main load control unit 15 performs load and execution of after-starting module 18.

FIG. 4A(3) shows a memory arrangement upon executing an after-starting module. After-starting module 18 is loaded in an area following the resident area of memory resident process group 2, but does not stay resident and is deleted from the main memory after the starting module process is completed.

FIG. 4A(4) shows a memory arrangement after all the starting processes have been completed. After-starting module 18 has been deleted and main load control unit 15 has also been deleted. However, the area for the main load control unit 15 remains unusable 19.

Figure 1B:
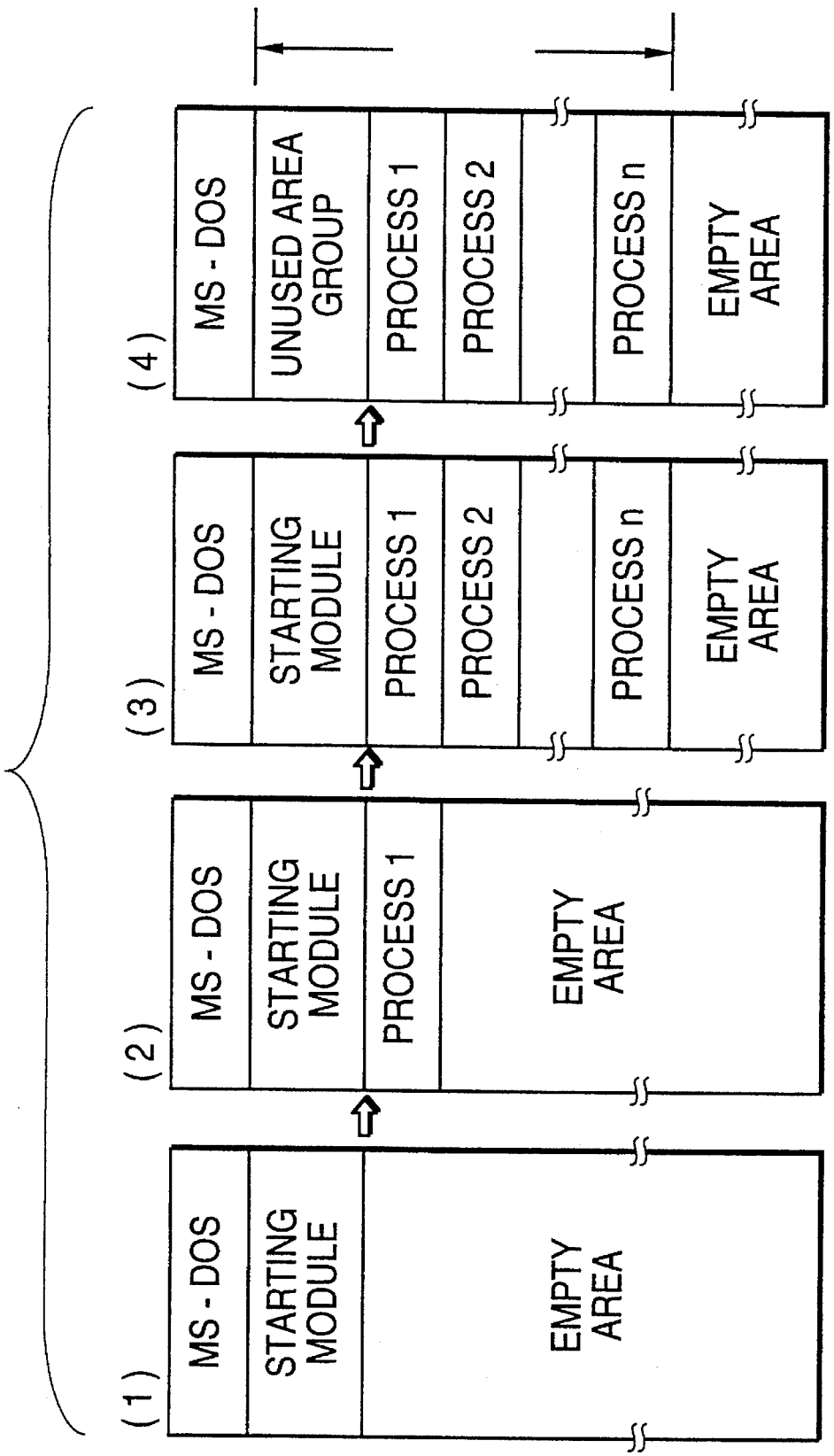
FIG. 1B is a diagram of memory location of the conventional system.

As shown in FIG. 4A, the area which cannot be used after completion of the starting is only the area in which main load control unit 15 is loaded. The magnitude of the before starting module and after-starting module are not related to the unusable area. The capacity of main load control unit 15 in the present invention is about 4 Kbyte. Thus, the unusable area 19 remaining after completion of the starting is about 4 Kbyte. Where the starting module is used as as shown in FIG. 1B in the conventional art, the capacity of the unused area of the memory is about 9 Kbyte. Therefore, with the present embodiment, the unused area can be decreased by about 5 Kbyte.

Where a further process is added to the starting process of the present embodiment, it is possible to prevent the unused area from increasing by adding the process to the before-starting module or the after-starting module instead of to the main load control unit.

Figure 4B:
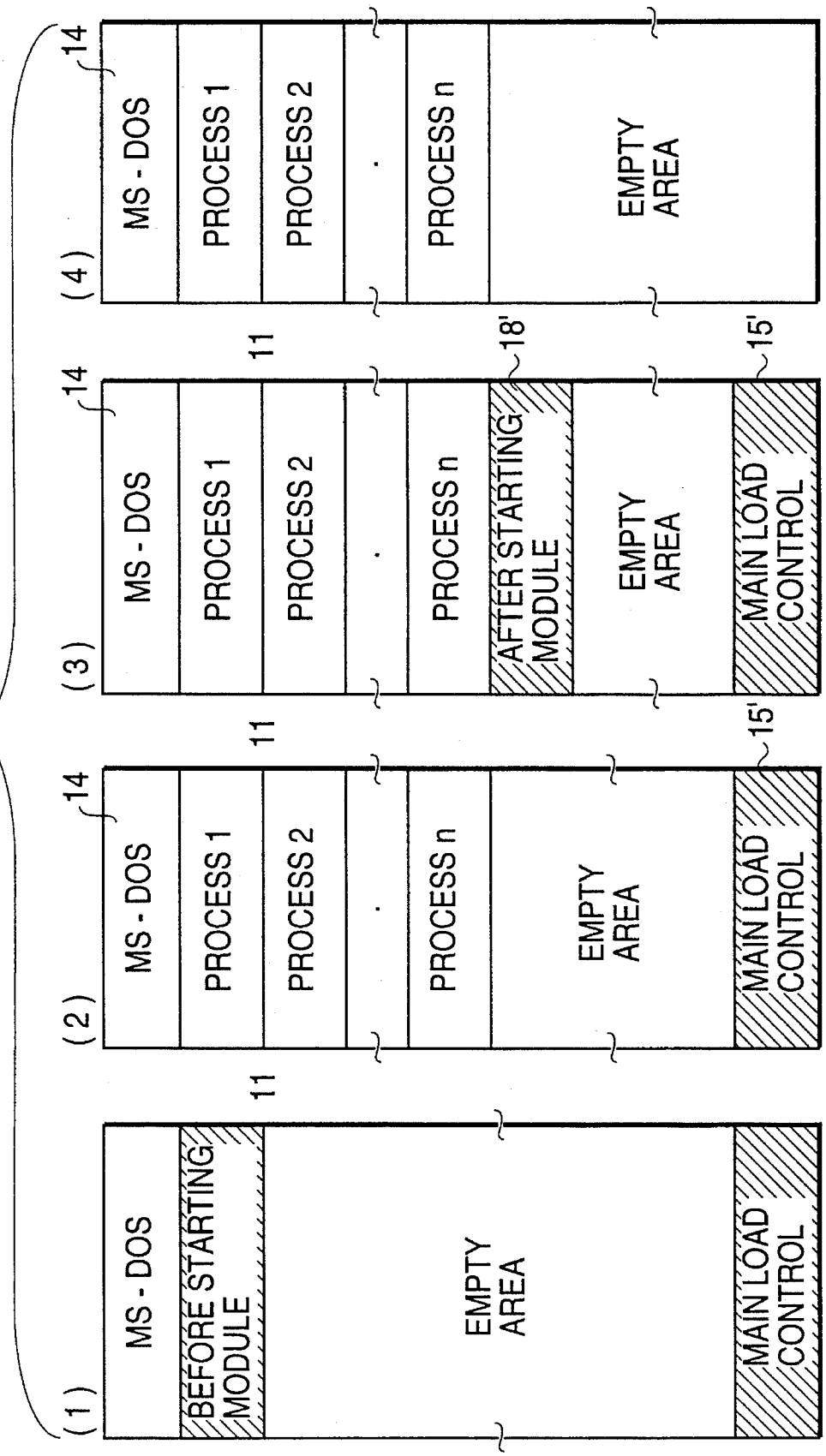
FIG. 4B is a diagram showing a memory location in another embodiment of the present invention.

FIG. 4B is a diagram showing a memory allocation of another embodiment according to the present invention. In the previously described embodiment, the main load control module is provided at an lower address following the MS-DOS area. In the embodiment shown in FIG. 4B, the main load control unit is provided at the uppermost address of the area which can be used by the user. In other words, the main load control unit is provided at the address which is located opposite to the area in which MS-DOS is loaded as shown in FIG. 4B (1).

At first, the main load control unit 15' is loaded at the uppermost address of the memory, then started and thereafter executed. The main load control unit 15' is executed by using a load & execute command after the before-starting module is loaded, as shown in FIG. 4B(1). Since the before-starting module 17' does not stay resident in the memory after the execution is completed, it can be loaded at the address following MS-DOS.

Before-starting module 17' performs the process in accordance with the flowchart shown in FIG. 3B, and is then ended. Thereafter, main load control unit 15' is executed and this time before-starting module 17' stored in the area is deleted. This deletion does not mean that the content of the area of the memory in which the before-starting module is loaded is deleted, but means that the loaded information in the area is deleted from a viewpoint of the system. Thereafter main load control unit 15' sequentially loads, starts and executes processes 1 to n in accordance with the load & execute command as shown in FIG. 4B(2).

Main load control unit 15' executes processes 1 to n and after respective processes complete and stay resident in the memory, the main load control unit 15 is again executed. Thereafter, after-starting module 18 is subjected to the load & execute command as shown in FIG. 4B(3). This after-starting module is stored in an address area following the loaded process n. The after-starting module 18 need not stay resident and thus is deleted after completion of the execution of the module. This deletion is performed in the same way as the deletion recited above. The main load control unit 15' does not need to stay resident and thus is also deleted as shown in FIG. 4B (4).

In FIG. 4A, the area in which the main load control is loaded follows the area of the MS-DOS. In contrast, in FIG. 4B, the main load control unit 15 is loaded in the upper-most address area of the memory. Thereafter, resident processes 1 to n are subjected to load & execute commands and then started. Thereafter, the main load control unit is deleted. As shown in FIG. 4B, the main control unit 15' includes the last address of the memory and thus the empty area after completion of the process is further broadened as compared with the case shown in FIG. 4A.

FIGS. 5A to 5C are operational flowcharts where the system comprising 3 memory resident processes is started. The basic flow is the same as that of the operational flowchart shown in FIG. 3. FIG. 5A is a flowchart of main load control unit 15. A total of five processes are subjected to load and execution by main load control unit 15, namely, a before starting module, three memory resident processes and an after starting module. As a result, the judgement process (S1 in FIG. 3A) "are all processes loaded and executed?" corresponds to the judgement process (S8 in FIG. 5A) "are five processes loaded and executed?". When the judgement of S8 is NO, the process to be next subjected to load and execution is subjected to load and execution. When five processes have been subjected to load and execution (judgement YES in S8) the process of main load control unit 15 is completed.

FIG. 5B is an operational flowchart of before starting module 17. Analysis of parameter (S10) and a check of starting environment (S11) are executed and then the control is returned to the main load control unit, resulting in completion of the process, in the same manner as explained in FIG. 3.

FIG. 5C is an operational flowchart of after starting module 18. The number of resident processes to be started is 3 and at first it is judged (S12) whether the start of the three processes is completed. When there is a process which is not started, (judgement at S12 is NO) the unstarted process is started (at S13), and when the start of the 3 processes is completed (judgement YES at S12), the system operation mode is set (S14) to the process after starting, and the process is returned to the main load control unit. The process at S14 designates the operational mode of the system so that the system comprising three memory resident processes operates in the operational mode designated by the parameter of the starting command.

In the above embodiment, the starting process is divided into three processes comprising the main load control unit, before starting module and after starting module. The starting process may be actually divided into any number of processes. For example, in FIG. 6, the before starting module may be divided into two processes comprising a parameter analyzing unit (FIG. 6A) and a checking unit of starting environment (FIG. 6B). In this case, the main load control unit performs six loads and module execution commands in the sequence of the parameter analyzing unit, the check unit of starting environment, process 1, process 2, process 3 and after operating module. Although the number of load and execute operations increases, the memory location does not change. Similarly, the after starting process may be divided into several steps.

As compared with the case where a large module comprising, for example, several tens of Kbytes are subject to load and execution, it is advantageous in respect of a debugging of the program or adding of function that the large module be divided into small modules depending on every function and to then perform load and execution operations for every function.

A more detailed explanation of the embodiment of the present invention will be made by referring to the actual embodiments hereinafter.

An explanation will be made by referring to a LINKSERVE library as an example of a system comprising a plurality of memory resident processes. The present library combines an MS-DOS computer system 1 with a host computer system 13 to provide a micro-mainframe link which provides various functions to the user. The LINKSERVE library comprises three memory resident processes including a transfer process, client process, and standard association process. When this library is used, these processes are made to stay resident in the main memory after being started. The standard association process comprises various processes to be provided to the user by the links of the library and has an interface to be executed when it is called from the user's application. The client process is closer to the system rather than the standard association process and has an interface to be executed by a call of the standard association process, the interface being the user server client interface. The transfer process is the closest one of these 3 processes to the system. It performs data transfer with the host computer in accordance with the rules relating to data transfer.

The LINKSERVE library includes a starting module for starting these processes. When the user inputs an LSVLIB command as an MS-DOS command, the starting module is executed. The starting module can be formed of the structure according to a starting module in an embodiment of the present invention.

FIG. 7 is an explanatory view of the LSVLIB command. After the command name of LSVLIB, the parameter for log obtaining request and standard association not starting designation can be designated. The log obtaining request parameter obtains the content of the data transfer into the file by using the LINKSERVE library and uses it for debugging. Character string "LOGCLINT", "LOGALL" and an abbreviation parameter can be designated. "LOG" designates a log obtaining process for tracing an input and output of the transfer process, "LOGCLINT" designates a log obtaining process for tracing an input and output of the client process, "LOGALL" designates a log obtaining process for tracing an input and output of both the transfer process and client process, and a parameter abbreviation designates that the log is not obtained.

On the other hand, the standard association not-operating designation parameter sets whether or not the standard association process is started. The user directly executes the client process through the user-server client interface. When the standard association process is executed, it is not necessary to enable the standard association process to stay resident in the memory for starting. In this case, by designating a character string "ONLYCLNT" on the part of the standard association not starting the designation parameter, two processes comprising client process and transfer process are started and the standard association process is not started. If the above parameter is not abbreviated, the standard association process is also started. As described above, the starting module for executing the start of three memory resident processes of the LINKSERVE library can be realized by the starting process explained in the previous embodiment of the present invention.

Figure 8:
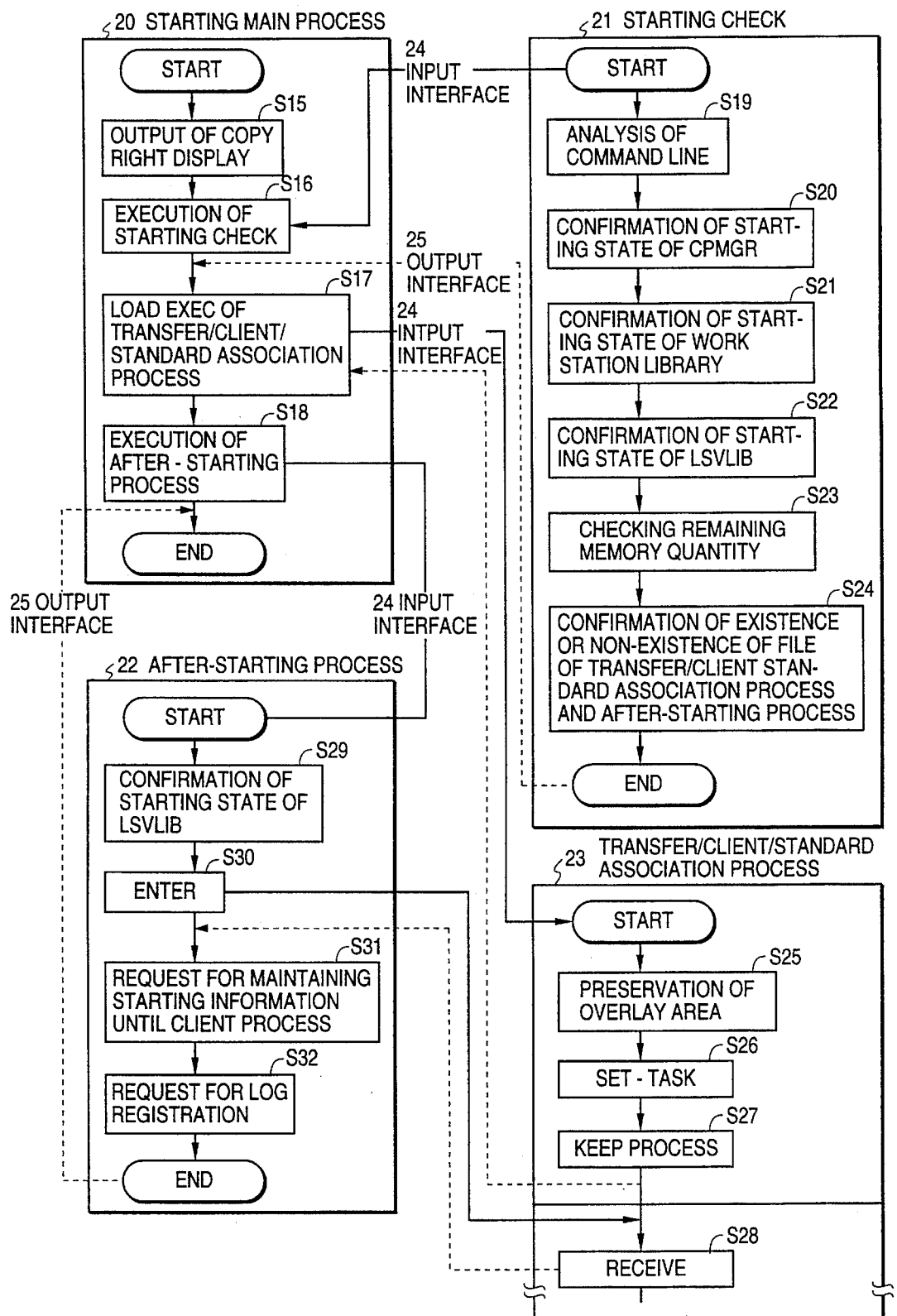
FIG. 8 is a flowchart of the starting process for starting 3 memory resident processes of a LINKSERV library.

FIG. 8 is an operational flowchart of the starting process of the LINKSERVE library.

The starting module comprises the main starting process 20 corresponding to main load control unit 15, and starting check 21 corresponding to the before-starting module 17 and after-starting process 22 corresponding to after-starting module 18, which is executed by starting main process 20. Input interface 24 and output interface 25 exist between a starting main process and a starting check, between starting main process and after starting process or between starting main process and transfer/client/standard association process 23. The request of the process execution and notification of the precess result are conducted through interfaces 24 and 25. The class to be transmitted is determined at transmission phase 1 of the transmission node, the determined class number is transmitted at transmission phase 2, and the class data is transmitted at transmission phase 3. These interfaces are the same as for the arguments in the program.

FIG. 9 shows a list of codes designating completion of respective processes which are notified through an output interface.

A completion code upon a normal completion of the process is 0×00. The completion code produced by the main starting process comprises a completion code representing that an execution format file for the starting check does not exist (0×02) or that a memory for operating the starting check does not exist (0×08). A completion code for producing the starting check comprises a parameter error (0×20), and the completion codes for producing the starting check and an after-starting process include an abnormal environment (0×21) and memory capacity lacking (0×23). A completion code for designating that the execution format file does not exist is (0×24). The process of starting the LINKSERVE library is explained by referring to the flowchart shown in FIG. 8. When a user issues an LSVLIB command, execution of a starting main process 20 of the LINKSERVE library is started. At first, a copyright notice of the LINKSERVE library is displayed on display 6 (S15) and starting check 21 is sequentially loaded in main memory 10 and starting check 21 is executed through input interface 24.

Starting check 21 analyzes a command line of the LSVLIB command requested by the user (S19), the process corresponding to the parameter analysis S10 in the operational flowchart of the before-starting module shown in FIG. 5B.

Next, a starting environment check (S11 in FIG. 5B) is conducted. The starting environment check confirms (S20, S21) the starting state of any required program, such as CPMGR illustrated in FIG. 10 and the workstation library under the control of MS-DOS confirms that (S22) a memory stay-resident process for the LINKSERVE library has been started, confirms (S23) remaining usable memory capacity, and confirms (S24) the existence or non-existence of the execution format file of a transfer/client/standard association process and after starting process which are to be executed.

Above process (S22) confirms that a memory resident process for the LINKSERVE library has not been started, and judges that the starting environment is abnormal where even a single such process has been already started. The process (S23) confirming remaining usable capacity judges whether the memory area necessary for loading transfer/client/standard association process 23 is available and determines that the memory area is lacking where the usable memory area is less than 100 Kbyte.

Respective processes included in the starting environment check, form a completion code designating the confirmation result and if the result is normal, the next process is performed. If the result is abnormal, the message designating the abnormal state is output to display 6, thereafter completing a starting check process.

When the starting check process 21 is completed, a completion code is transmitted to the starting main process 20 and through the output interface 25 control is returned to the starting main process. Starting main process 20 confirms a completion code and in case of an abnormal completion code, the starting process is ended. In case of a normal completion code, the transfer process, client process and standard association processes are loaded in main memory 10 in this sequence and respective processes are executed through input interface 24 (S17). If respective processes of transfer/client/standard association process 23 are executed, preserving process (S25) of an overlay area is conducted except in the case of the transfer process. Thereafter, a function SET (TASK) is called and the task number of respective processes is registered (S26). Further, respective processes are made to stay resident in the memory (S27) by a KEEP process which is provided in MS-DOS. Control is returned to starting main process 20 and process S17 continues if the process fails to stay resident in memory. Also, the execution of the following processes is not conducted, thereby ending step S17. If the process does stay resident in memory, the load and execute operation is completed for all the processes of transfer/client/standard association processes 23, thereby ending step S17.

Load and execute is a module for performing a pre-process for an occurrence of an event after the process is loaded and executed. The processes which stay resident in the memory due to the load and execute are executed by a later described starting operation when the event is produced. Next, starting main process 20 executes an after starting process through an input interface 24 (S18). Where an execution of the after starting process has failed, recovery is impossible and a request for pre-setting the memory is outputted for the user.

After-starting process 22 examines whether or not respective processes of the LINKSERVE library can be normally subjected to load and execute operations in step S17. When there is a process in which the load and execute operation fails, the request for completion is provided to the processes which have already completed the load and execute operation, which processes failing the load and execute being deleted from the memory (S29).

When three processes start normally, an ENTER command for an operation is executed for the started process (S30). The process subjected to ENTER executes an initial process, a function RECEIVE is called and the process is placed in a stopping state (S28). The process is thus changed to a state in which the data can be received at any time. The function RECEIVE returns control to the portion after ENTER of the after starting process. Where three processes are started normally, after starting process 22 is a client process to maintain the starting information (S31) which notifies the user whether or not respective processes are started or where respective processes are located in the memory. Next, where the load obtaining request parameter is not abbreviated, and the request for log obtaining is made, log recording is requested for a client process (S32). When the after starting process is completed, the operation result is returned to starting main process 20 through output interface 25. Simultaneously, control is returned to the starting main process, and the starting main process is ended.

FIG. 10 shows a memory location in respective steps of the starting process. Before the LINKSERVE library is searched, MS-DOS 14, CPMGR 26 and workstation library 27 are loaded in main memory 10 and started.

Upon executing a starting check, as shown in FIG. 10(1), starting main 20 and starting check 21 exist in main memory, and the process is carried out. Upon a completion of the starting check process, starting check 21 is deleted from the main memory and transfer/client/standard association processes 23 are executed. FIG. 10(2) shows a memory location when these 3 memory resident processes (23) are made to stay resident in a memory. Starting check 21 is already extinguished and the transfer process stays resident in an area in which a starting check is performed.

FIG. 10(3) shows a memory location upon executing the after-starting process. After the transfer/client/standard association processes 23 are performed, after-starting process 22 is loaded. Upon completion of the after-starting process, after-starting process 22 is deleted from main memory and the memory usage becomes as shown in FIG. 10(4). When a process of the starting main is completed, the area in which the starting main is loaded remains as unusable area (unused area 19). After the LINKSERVE library starts, an area which cannot be used is only the unused area 19.

Figure 11:
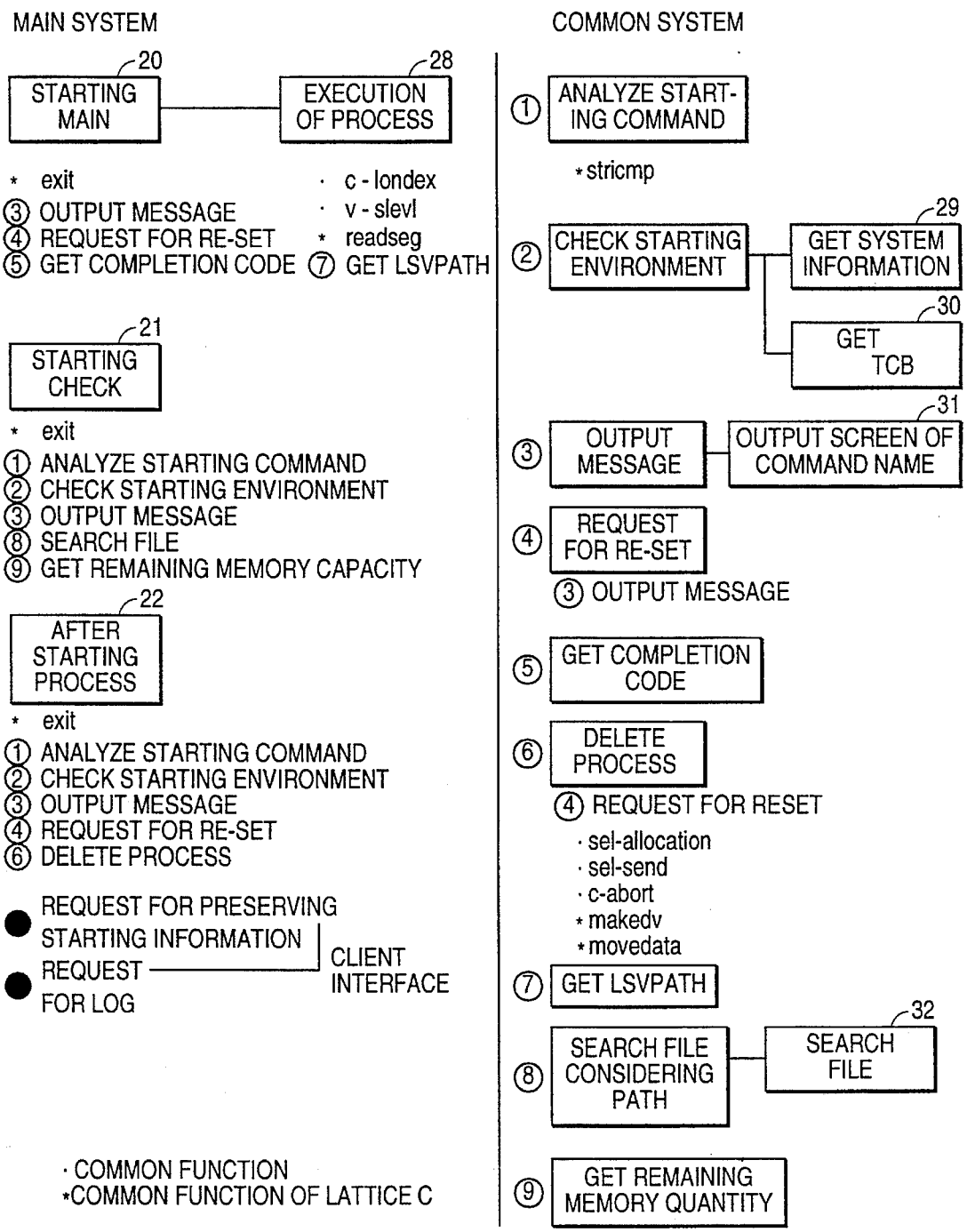
FIG. 11 is an explanatory view of respective modules according to the present invention.

FIG. 11 is a structural view of the module for performing the starting process of the LINKSERVE library, and FIG. 12 is an explanatory view of respective modules.

The starting process module is divided into a module of the main system comprising a main process of the starting process, and a common system module used by respective modules of the main system (FIG. 11). The process of the main system comprises a starting main 20, starting check 21, and after starting process 22. Under the starting main 20, the module for the process execution 28 is provided. Respective modules comprise a common function of CPMGR started under the MS-DOS, a LatticeC common function, and a common module developed for the starting process of the LINKSERVE library.

Starting main 20 uses an exit function for setting a completion code, and three common system modules comprising message control output ③ for outputting the message, reset request ④ for outputting the message designating the abnormal end and for outputting the message requesting a user to push a reset switch, when the abnormal state is detected, and a completion code gets file for getting a completion code of a member process. Numerals 1 to 9 designate the same processes in FIGS. 11 and 12.

The execution 28 of the processes located under the starting main comprises a function c-loadex, for loading a process into main memory, a function v-slevl for designating whether the process is on the DOS level or on the back level, a function readseg for getting information of a segment on which a process itself operates, and a common module LSVPATH ⑦ for getting a character string for designating a location in which the LINKSERVE library is installed.

Starting check 21 uses an exit function for setting a completion code and five common system modules (comprising starting command analysis ①, starting environment check ②, message output ③, file searching ⑧, and getting a remaining memory quantity ⑨). The starting command analysis ① analyzes a parameter of the starting command. The starting environment check ② determines whether or not the necessary processes are started. File searching ⑧ searches for a file by considering an installing position of the LINKSERVE library obtained by LSVPATH. Getting a remaining memory capacity ⑨ is for measuring the remaining memory capacity which can be used.

After starting process 22 uses an exit function for setting a completion code, five common system modules (comprising starting command analysis ①, starting environment check ②, message output ③, reset request ④, requesting the starting information maintenance and log request. The deletion ⑥ of the process deletes the process from the main memory.

Starting command analysis ① uses a common function stricmp for comparing a character string provided by LatticeC. Starting environment check ② comprises a system information getting module for confirming the starting state of CPMGR, and a TCB getting module provided under the message output ③ for confirming the starting state of the provided module for outputting a character string into the screen. Further reset request ④ uses the message output ③. The deletion ⑥ of the process comprising reset request ④, common function sel-allocation for dubbing a location of a mail box used for performing process-process communication, a common function c-abort for deleting a process, a function makedv for resolving an address into a segment offset, and a function movedata for copying the data from a certain area. makedv and movedata are common functions of LatticeC. Under the module of performing a search ⑧, a file considering a path and a file search module for searching, with which a matching is established for the first time, is provided.

In addition, the modules for forming the starting process further include a purge control module for controlling purging of respective processes and for deleting the processes, a basic information conversion module for converting the basic information concerning an error of the client process to an output format by which the output is actually conducted, when the error code is output on the display, numerical value 4-bit character string conversion module for converting a numerical value to a character string of 4 bits and a module comprising a starting main header, starting check header and reset request header for storing a message outputted upon operating a starting main, starting check and reset request (as shown in FIG. 12). Three memory resident processes of the LINKSERVE library are explained by referring to a flowchart shown in FIGS. 13 to 15.

Figure 13:
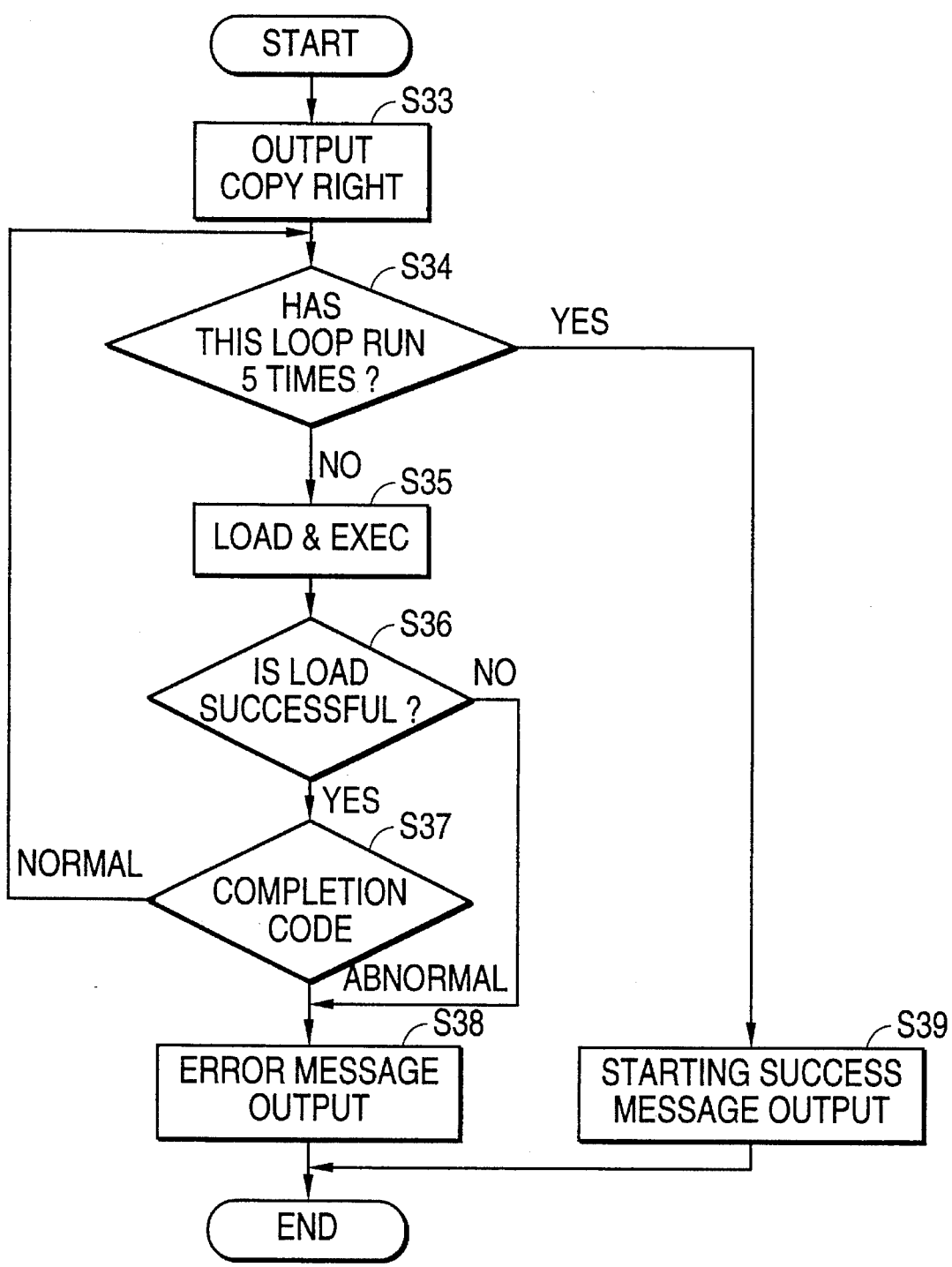
FIG. 13 is an operational flowchart of the starting main process.

FIG. 13 is a flowchart of starting main 20. Starting main 20 first outputs a copyright (S3) and then judges whether the five processes have been subjected to load & execution (S34). When a process yet to be subjected to load & execution remains (judgement NO at S34), the process is subjected to load and execution (S35). Thereafter, it is judged (S36) whether the load process is successful. When the load process is successful (judgement YES at S36), a completion code judges whether the process is normal or abnormal (S37). When the loading process is unsuccessful (judgement NO at S36), and when the completion code is abnormal (judgement "abnormal" at S37) the error message is output (S38), and then the process of the starting main is ended. When load & execution of five processes ends normally (judgement YES at S34), the message designating the success of the starting operation is output (S39) and then the process of the starting main is completed.

Figure 14:
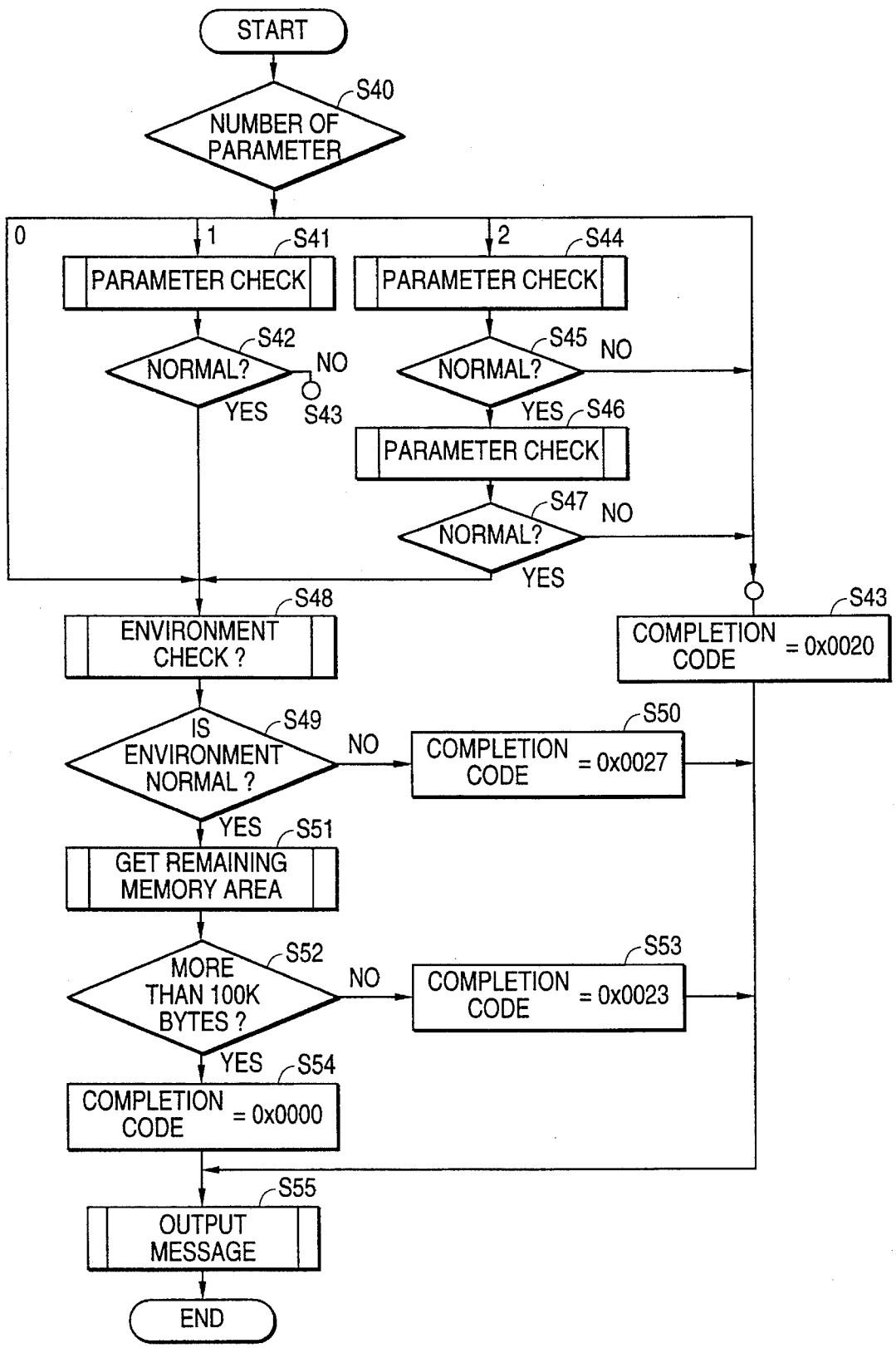
FIG. 14 is an operational flowchart of the starting check process.

FIG. 14 shows a flowchart of starting check 21. Starting check 21 is a process which executes load & exec command first at S15.

At the starting check, the process is divided in accordance with the number of parameters designated by the starting command (S40). Where the parameters do not exist, a branch 0 (S40) indicates that the starting command designated by a user does not get a log and a standard and association process is started. Thus the parameter analysis is not performed and the process proceeds to an environment check at S48. Where the number of parameters is more than 3 and where the number of branches at S40 is more than 3 and it is considered that the designation of the parameter is in an error, the parameter error 0x0020 is set (S43) in the completion code. The process of the starting check is completed after a message designating a parameter error is output (S55).

Where the number of parameters of the starting command is one (a branch 1 at S40), the process of confirming the parameter is performed (S41). If the designation of the parameter is normal, (YES at S42) the process proceeds to an environment check at S48. If the parameter is abnormal (NO at S42), the process is judged as being a parameter error and proceeds to S43. If the number of starting parameters is 2 (a branch 2 at S42), a check of the first parameter is performed at S44. If the parameter is normal (YES at S45), the check of the second parameter is performed at S46 and if the second parameter is normal (YES at S47), the process proceeds to the environment check at S48. Where either of 2 parameters is abnormal (NO at S45 or NO at S47) the process is judged as being a parameter error, and the process proceeds to S43.

When the parameter is normal, an environment check S48 is conducted. This check S48 is a check process of CPMGR to be started before LINKSERVE library is started. If the environment is abnormal (judgement NO at S49), the environment is then judged as being abnormal and the completion code is set 0x002? (S50) and the message output is executed at S55, thereby completing the starting check. If the environment is normal (judgement YES at S49), process S51 for getting the remaining memory quantity is executed. If the remaining memory quantity is less than 100 Kbyte (judgement NO at S52) a completion code (S53) indicating a lack of memory is set. If the remaining memory quantity is more than 100 Kbyte (judgement YES at S52), a completion code (S54) designating a normal environment is set and the starting check process is ended through message output S55.

Figure 15:
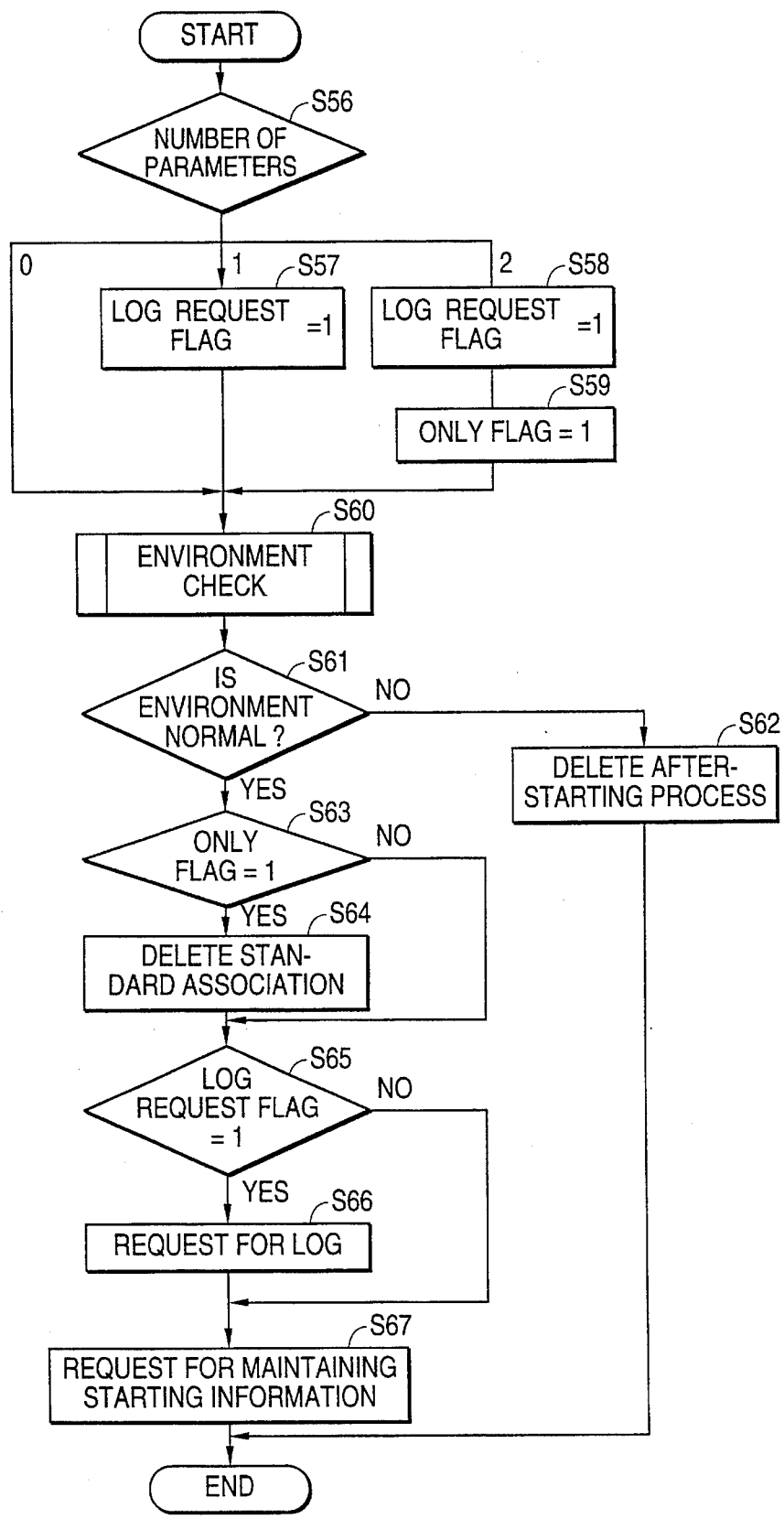
FIG. 15 is an operational flowchart of the after-starting process.

FIG. 15 shows a flowchart of after-starting process 22. The after-starting process is a process module in which a starting main performs a load & execute operation at the last moment at S15.

A branch of the starting process can be conducted depending on the number of parameters even in the after-starting process (S56). If the number of parameters is 0, the process proceeds to the environment check S60. If the number of parameters is 1, the process requests a logging and thus a flag for requesting the log is turned to "1" (S57) and then the process proceeds to environment check S60. If the number of parameters is 2, it means that a request has been made for logging and for not-starting the standard association process. Thus, the log request flag is set to "1" (S58), ONLY flag is set to "1" (S59), and then the process proceeds to an environment check S60.

Environment check S60 checks if the 3 memory resident processes are started. If an abnormally started process exists (judgement NO at S61), it is deleted (S62), and the after-starting process is completed. If the environment is normal (judgement YES at S61), it is judged whether the ONLY flag is "1" (S63). If ONLY flag is not "1" (judgement NO at S63) then the process is not changed. If the ONLY flag is "1" (judgement YES at S63), the standard association process is deleted (S64) and then the process proceeds to S65.

It is judged at S65 whether the log request flag is "1". If the log request flag is not "1" (judgement NO at S65) the process is not changed. If the log request flag is "1" (judgement YES at S65) the log request is passed to a client process (S6) and then the process proceeds to S67. At S67, the starting information maintaining request is passed to a client process, thus completing the after-starting process.

As described above, the starting process is divided into a starting main (main load control unit), a starting check (before-starting module) deleted from the main memory after completion of the process, and an after-starting process (after-starting module) which is also deleted from the main memory after completion of a process. The capacity of the main memory which remains unusable after completion of starting process is thereby minimized.

In FIG. 4B, main load control unit 15' is loaded at the last area of the memory, before-starting module 17' is loaded in the area following MS-DOS, and after-starting module 18' is loaded at the process following the loaded process and then 1 to n are made to stay resident and thus are started. However, the present invention is not limited to the above case. For example, before-starting module 17' and after-starting module 18' may be loaded before an area in which the main load control unit 15' is loaded.

The capacity of the starting main realized by the present invention is about 4 Kbyte and the capacity for the starting check and the after-starting process are respectively 6 and 7 Kbyte. The unusable memory capacity after the starting process corresponds to the capacity of the starting main, namely, about 4 Kbyte. If this memory capacity is compared with the conventional method, in which the unusable memory capacity is about 9 Kbyte, the memory area which can be used by the user is increased by about 5 Kbyte.

If a function of the starting process is added, the added function may be included in the starting check or after-starting process and thus the function can be added without decreasing the capacity of the memory which can be used by the user. Thus, the present invention can deal flexibly with expansion of the function of the starting process.

According to the present invention, the process of the main load control unit can be minimized, and as a result the capacity of the unusable memory area produced after completion of the starting process of a plurality of memory resident processes can be minimized. Further, by adding a new process for improving the function to a before-starting module or an after-starting module, it becomes unnecessary to consider an increase in the capacity of usable memory area, thus making the design of the starting module more flexible.

What is claimed is:

1. A starting system for starting a plurality of memory resident processes executed in a memory of a data processing system in accordance with operation of a disk operating system loaded into a first area of the memory, said starting system comprising:

initiation means for supplying a start command requesting a main load operation;

main load control means using a second area following the first area of the memory, for performing a load and execute operation by loading the plurality of memory resident processes into a third area following the second area in response to said initiation means, invoking a pre-start checking operation, starting each of the plurality of memory resident processes in response to the starting command and invoking a post-start checking operation;

pre-start checking means using the third area following the second area, for analyzing parameters associated with the starting command to define how the memory resident processes are to be started, for checking a starting environment and for passing information obtained thereby to said main load control process, all of the third area used by said pre-start checking means being released before the plurality of memory resident processes are loaded therein; and post-start checking means using a fourth area following the third area used by the plurality of memory resident processes, for checking whether all of the plurality of memory resident processes have been started and for informing said main load control process of the checking.

2. A starting system for starting a plurality of memory resident processes executed in a memory of a data processing system in accordance with operation of a disk operating system loaded into a first area of the memory, said starting system comprising;

initiation means for supplying a start command requesting a main load operation;

main load control means using a second area of the memory including a last address of the memory, for performing a load and execute operation by loading the plurality of the memory resident processes into a third area following the first area, in response to said initiation means, invoking a pre-start checking operation, starting each of the plurality of memory resident processes in response to the start command and invoking a post-start checking operation;

post-start checking means using a fourth area following the third area used by the plurality of memory resident processes, for checking whether all of the plurality of memory resident processes have been started and for informing said main load control process of the checking; and pre-start checking means using the third area following the first area, for analyzing parameters associated with the starting command to define how the memory resident processes are to be started, for checking a starting environment and for passing information obtained thereby to said main load control process, all of the third area being released before the plurality of memory resident processes are loaded, said pre-start checking means performing pre-processing before the plurality of memory resident processes are loaded.

3. A method of loading a plurality of memory resident modules in available memory of a computer, said method comprising the steps of:

(a) recognizing a requirement of starting the memory resident modules;

(b) loading a main load control module at a high end of the available memory;

(c) loading a before starting module at a low end of the available memory by executing the main load control module;

(d) checking the requirement by executing the before starting module;

(e) releasing the memory where the before starting module was loaded;

(f) loading the memory resident modules at the low end of the available memory and starting the memory resident modules, by executing the main load control module;

(g) loading an after starting module in the available memory by executing the main load control module;

(h) checking the status of the memory resident modules by executing the after starting module;

(i) releasing the memory where the after starting module was loaded; and (j) releasing the memory where the main load control module was loaded.

* * * * *